March 27, 1956     E. A. ROLF     2,739,518
SHANK HOLDER
Filed April 19, 1952
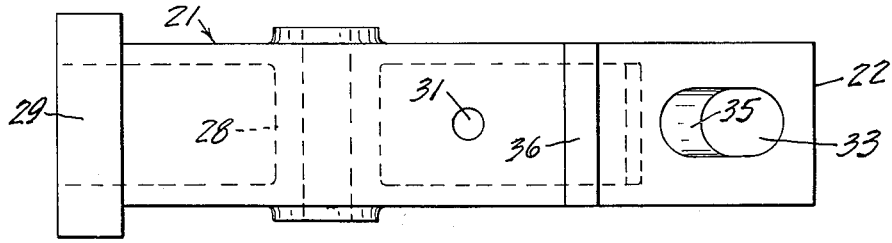
FIG. 2
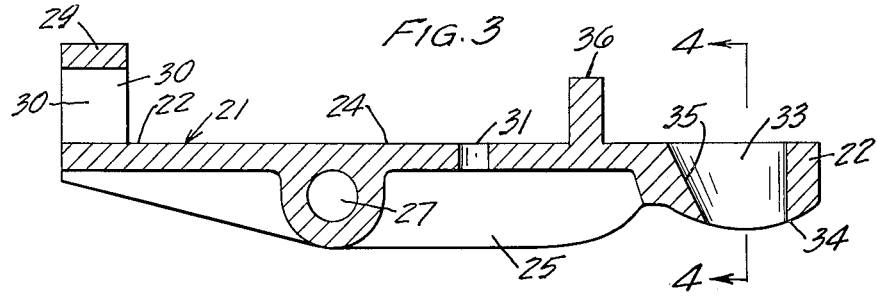
FIG. 3
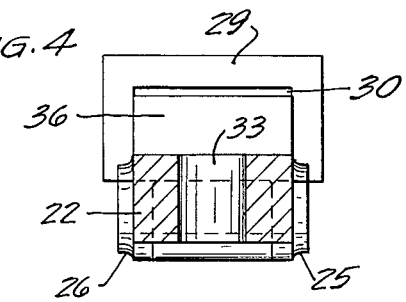
FIG. 4
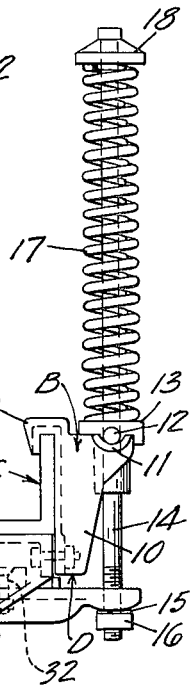
FIG. 1
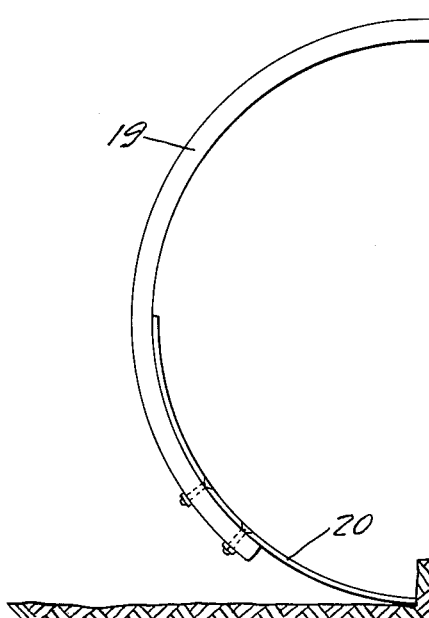
INVENTOR
ELMER A. ROLF
BY Williamson, Williamson, Schroeder & Adams
ATTORNEYS

United States Patent Office 2,739,518
Patented Mar. 27, 1956

2,739,518

SHANK HOLDER

Elmer A. Rolf, Glencoe, Minn., assignor to Glencoe Manufacturing Company, Glencoe, Minn., a corporation of Minnesota Application April 19, 1952, Serial No. 283,174

2 Claims. (Cl. 97—47.84)

This invention relates to shank holders for holding the shanks of agricultural implements and the like. More particularly, it relates to shank holders for holding the shank of an agricultural implement or the like which is constantly urged into ground-engaging relation and which must necessarily be able to rock or pivot at its forward end to permit the implement to yield when exceptionally heavy obstructions are met.

It is a general object of my invention to provide a novel and improved shank holder of cheap and simple construction.

Another object is to provide a novel and improved shank holder upon which the shank may be quickly and simply mounted.

Another object is to provide a shank holder adapted to be pivotally mounted for use in conjunction with an upright upwardly urged tension rod at its forward end and having its forward end portions so constructed as to facilitate such pivotal movement.

These and other objects and advantages of my invention will more fully appear from the following description made in connection with the accompanying drawings, wherein like reference characters refer to the same or similar parts throughout the several views, and in which:

Fig. 1 is a side elevational view of one embodiment of my invention used in conjunction with a pair of mounting members which secure the ground implement to a cross member of an agricultural machine;

Fig. 2 is a top plan view of my shank holder;

Fig. 3 is a longitudinal sectional view of the same; and

Fig. 4 is a transverse vertical sectional view taken approximately along line 4—4 of Fig. 3.

One embodiment of my invention is shown in Fig. 1 pivotally mounted upon a pair of mounting members indicated generally as A and B. These mounting members positively engage the cross member C of the agricultural machine. As shown, the mounting member A has a channel element 5 and a pair of depending webs 6 which extend downwardly from its opposite sides and each of which has a transversely extending aperture 7 formed therethrough. These apertures carry pivot pin 8 which extends thereacross and therethrough to provide a pivotal axis for the shank holder which embodies my invention. The other mounting member B has a channel member 9 which engages the cross member C and a pair of spaced generally triangularly shaped side portions 10 which extend vertically and forwardly with respect to the cross member C. Each of the side portions 10 has a groove or recess 11 adapted to receive therein the ears 12 of a collar 13 which is slidably mounted upon an upright tension rod 14. The tension rod 14 is threaded at its lower end and carries a washer 15 and a nut 16 thereupon. Mounted on the upper end portion of the tension rod 14 is a compression spring 17 the lower end of which abuts against the collar 13 and the upper end of which abuts against the broad end portion 18 of the tension rod. The compression spring 17 continuously urges the collar 13 downwardly and resists any attempt to draw the tension rod 14 further downwardly. The two mounting members A and B are held together by bolts D so that the channel members 5 and 9 will positively engage the cross member C and provide a rigid mounting for the shank holder shown.

The structure recited above is utilized in conjunction with my shank holder to mount a shank 19 and an agricultural implement 20, which it carries, upon the cross member C.

Figs. 2, 3 and 4 show in greater detail the shank holder which embodies my invention. As shown, it includes a rigid elongated bar 21 which has a forward end portion 22, a rearward end portion 23, and a medial portion 24. Along its side edges is a pair of spaced and oppositely depending webs 25 and 26 which extend longitudinally of the bar 21 and have oppositely disposed apertures 27 formed therethrough, these apertures extending transversely of the bar 21 and being adapted to receive the pivot pin 8 which extends through the lower end portion of the mounting member A. A sleeve element 28 having the same internal bore as the apertures 27 connects the two side webs 25 and 26 to provide a pivotal bearing for the bar 21.

Mounted upon the upper surface of the bar 21 and extending upwardly therefrom is a longitudinally extending sleeve element 29, the bore 30 of which is of such size as to readily receive the shank 19 therethrough so that the shank will extend longitudinally of the bar 21. Formed through the bar 21 on the opposite side of the sleeve 28 with respect to the sleeve 29 is a vertically extending aperture 31 adapted to receive a bolt 32 which rigidly affixes the forward end of the shank 19 to the bar 21 at that point.

The forward end portion 22 of the bar 21 is vertically apertured as at 33 and has a lower surface 34 which is shaped convexly and which functions as an abutment surface for the washer 15 and is urged upwardly by the spring 17 and the nut 16. The bore of the aperture 33 is such that the portion of the bar 21 which forms the rear wall 35 of the aperture slopes upwardly and rearwardly as best shown in Fig. 3. The aperture 33 itself is of greater dimensions longitudinally of the bar than transversely as is best shown in Fig. 2.

Mounted on the upper surface of the bar 21 and extending upwardly therefrom is an abutment shoulder 36 which is positioned between the aperture 31 and the aperture 33. This abutment shoulder 36 when the entire unit is assembled abuts against the lower end portion of the mounting member B to prevent the upper surface of the forward end portion of the plate 21 from pivoting to a position above horizontal.

In operation, the shank holder is mounted upon the mounting members A and B in the manner shown in Fig. 1 with the shank slid from the rear through the sleeve 29 and affixed by the bolt 32 to the portion of the bar forward of the transverse sleeve 28. The shank holder is pivotally mounted between the depending webs 29 of the mounting member A by slipping the pivot pin 8 through the aperture 7 of the web and through the sleeve 28. The tension rod 14 is then inserted through the aperture 33 and the washer 15 and the nut 16 threaded onto the lower end portion of the tension rod 14 so that the washer 15 will abut against the abutment surface 34 of the forward end portion of the shank holder.

As the agricultural machine (not shown) is drawn forwardly the implement 20 is maintained in ground-engaging position by the upward urging upon the forward end portion of the shank holder which is exerted by the tension rod 14 and the spring 17. Whenever an obstacle is encountered or a particularly hard area of ground is engaged the implement tends to raise upwardly and the shank and the shank holder pivot about the pivot pin 8 with the forward end portion 22 of the shank holder moving downwardly in the direction shown by the arrow in Fig. 1. As this takes place the angle between the top surface of the bar 21 and the tension rod 14 changes and the tension rod 14 moves over toward the rearwardly sloping rear wall portions 35 of the aperture 33. At the same time the washer 15 slides easily forwardly around the convexly shaped abutment surface 34. By so constructing my shank holder the pivotal movement of the same is unobstructed and unhindered except for the upward urging of the spring 17. Thus my shank holder makes its possible to provide a truly pivotal mounting for the forward end of the shank 19 and places a much lesser strain upon the implement 20 itself which in the past has frequently resulted in undue and unnecessary breakage of the implement.

Thus it can be seen that I have provided a novel and improved shank holder of extremely simple and cheap construction. It can be readily seen that my shank holder is constructed so as to provide the maximum in freedom of pivotal movement of the same so that no undue strain is placed upon any part of the mounting or holder for the shank. The freedom of movement provided by the rearwardly extending walls 35 of the aperture 33 and the pivotal mounting of the tension rod 14 provided by the ears 12 of the collar 13 and the grooves 11 makes it possible for the read end portion of the shank 19 to raise to any level which may ordinarily be required in ground-working operations.

It will of course be understood that various changes may be made in the form, details, arrangement, and proportions of the various parts without departing from the scope of my invention.

What is claimed is:

1. A shank holder comprising a rigid elongated bar, means for rigidly connecting the shank to the rearward end portion of said bar to extend longitudinally thereof, a transversely extending sleeve element mounted upon the medial portion of said bar and adapted to pivotally connect the holder to an implement mounting for pivotal movement relative thereto, said bar having an aperture formed at its forward end portion for receiving therethrough an upright upwardly and resiliently urged tension rod having a washer and nut at its lower end for abutment against the lower surface of said forward end portion, the lower surface of the forward end portion of said bar surrounding said aperture being convexly shaped to facilitate the pivotal movement of the holder relative to the mounting while the forward portion thereof is urged upwardly by the washer and nut on the tension rod.

2. A shank mounting having in combination a rigid elongated bar, an upstanding sleeve element mounted upon the rearward end portion of said bar with the opening of said sleeve element extending longitudinally of said bar to accommodate a shank therewithin and to facilitate the connection of the shank to said bar, and a transversely extending sleeve element mounted upon the medial portion of said bar and adapted to pivotally connect the bar to an implement mounting for pivotal movement relative thereto, said bar having an aperture formed in its forward end portion, a vertically movable upwardly and resiliently urged tension rod extending through said aperture and having a washer and nut at its lower end for abutment against the lower surface of said forward end portion, the lower surface of the forward end portion of said bar surrounding said aperture being convexly shaped to facilitate the pivotal movement of said bar relative to the mounting while the forward portion thereof is urged upwardly by the washer and nut on the tension rod.

References Cited in the file of this patent

UNITED STATES PATENTS

| | | |
|---|---|---|
| 287,965 | Rix | Nov. 6, 1883 |
| 304,713 | Elder | Sept. 9, 1884 |
| 431,981 | Jones | July 8, 1890 |
| 2,493,811 | Graham | Jan. 10, 1950 |
| 2,627,798 | Graham | Feb. 10, 1953 |

FOREIGN PATENTS

| | | |
|---|---|---|
| 57,391 | Denmark | Mar. 10, 1940 |